United States Patent [19]

Derouane et al.

[11] Patent Number: 4,639,357

[45] Date of Patent: Jan. 27, 1987

[54] CRYSTALLINE SILICOPHOSPHOALUMINATE MCM-5

[75] Inventors: Eric G. Derouane, Namur, Belgium; Roland von Ballmoos, Pennington, N.J.

[73] Assignee: Mobil Oil Corporation, New York, N.Y.

[21] Appl. No.: 685,172

[22] Filed: Dec. 21, 1984

Related U.S. Application Data

[63] Continuation-in-part of Ser. No. 562,908, Dec. 19, 1983, abandoned.

[51] Int. Cl.$^4$ .................. C01B 25/36; C01B 33/28
[52] U.S. Cl. .................. 423/306; 423/325; 423/329; 502/214
[58] Field of Search ............ 423/306, 328, 329; 502/214

[56] References Cited

U.S. PATENT DOCUMENTS

| | | | |
|---|---|---|---|
| 2,876,266 | 4/1959 | Wegner et al. | 260/641 |
| 3,697,550 | 10/1972 | Bayne et al. | 260/346.8 |
| 3,801,704 | 4/1974 | Kobayashi et al. | 423/309 |
| 3,904,550 | 9/1975 | Pine | 252/437 |
| 4,014,945 | 3/1977 | Zimmerschied | 260/635 |
| 4,071,471 | 1/1978 | Banks et al. | 252/437 |
| 4,158,621 | 6/1979 | Swift et al. | 208/114 |
| 4,179,358 | 12/1979 | Swift et al. | 208/114 |
| 4,210,560 | 7/1980 | Kehl | 252/437 |
| 4,222,896 | 9/1980 | Swift et al. | 252/437 |
| 4,228,036 | 10/1980 | Swift et al. | 252/437 |
| 4,310,440 | 1/1982 | Wilson et al. | 252/435 |
| 4,361,705 | 11/1982 | Marcelin et al. | 568/462 |
| 4,363,748 | 12/1982 | Crum et al. | 252/437 |
| 4,365,095 | 12/1982 | Marcelin et al. | 568/462 |
| 4,385,994 | 5/1983 | Wilson et al. | 210/689 |
| 4,440,871 | 4/1984 | Lok et al. | 502/214 |

FOREIGN PATENT DOCUMENTS 2068253 1/1981 United Kingdom .

OTHER PUBLICATIONS

Magee et al, "Zeolite Chemistry and Catalysis" ACS Monograph 171, 1976, pp. 615–619.

*Primary Examiner*—John Doll
*Assistant Examiner*—Lance Johnson
*Attorney, Agent, or Firm*—Alexander J. McKillop; Michael G. Gilman; Dennis P. Santini

[57] ABSTRACT

A new crystalline silicophosphoaluminate designated MCM-5 and having a particular crystal structure is provided. This crystalline material has ion-exchange properties and is readily convertible to catalytically active material.

18 Claims, No Drawings

CRYSTALLINE SILICOPHOSPHOALUMINATE MCM-5

CROSS-REFERENCE TO RELATED APPLICATION

This is a continuation-in-part of application Ser. No. 562,908, filed Dec. 19, 1983 now abandoned.

BACKGROUND OF THE INVENTION

1. Field of the Invention

This invention relates to a novel synthetic crystalline silicophosphoaluminate material, designated "MCM-5", containing aluminum silicon and phosphorus in its framework and to use thereof in catalytic conversion of organic compounds. The crystalline material of this invention exhibits ion-exchange properties and can easily be converted to catalytically active material.

2. Description of Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formaton of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

The silicophosphoaluminate of the present invention is not an aluminosilicate zeolite, but it is a crystalline material with a dense or layered structure having ion-exchange properties.

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. U.S. Pat. No. 3,801,704 teaches an aluminum phosphate treated in a certain way to impart acidity.

The phosphorus-substituted zeolites of Canadian Pat. Nos. 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Pat. No. 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by pre-molded silicates or aluminosilicates.

Aluminum phosphates are well known in the art as exemplified by U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst suppots or matrices. The crystalline silicophosphoaluminate synthesized hereby exhibits ion-exchange properties and is easily and conveniently converted to material having intrinsic catalytic activity.

U.S. Pat. No. 4,440,871 teaches silicoaluminophosphates, none of which have the structure of MCM-5.

SUMMARY OF THE INVENTION

The present invention is directed to a novel synthetic crystalline silicophosphoaluminate material hereinafter designated "MCM-5", containing aluminum, silicon and phosphorus and to its use as a catalyst component in catalytic conversion of organic, e.g. hydrocarbon, compounds.

The anhydrous crystalline MCM-5 has the general formula:

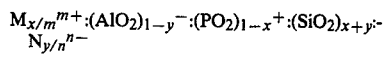

wherein M is a cation of valence m, N is an anion of valence n, and x and y are numbers of from greater than $-1$ to less than $+1$ which satisfy the relationships:

(1) is x is 0, then y is not 0,
(2) if y is 0, then x is not 0,
(3) if the atomic ratio of Al/P is greater than 1, then $(x+y)$ is greater than 0.001 and $y+0.6x$ is less than 0.4, and
(4) if the atomic ratio of Al/P is less than 1, then $(x+y)$ is greater than 0.001 and $x+0.5y$ is less than 0.5.

In the composition above, when x is greater than y the silicophosphoaluminate is a cation exchanger with potential use as an acidic catalyst. When x is less than y, the silicophosphoaluminate is an anion exchanger with potential use as a basic catalyst. Such MCM-5 crystalline material has the characteristic X-ray diffraction pattern, in its calcined form, as set forth in Table 1-B hereinafter.

In the as synthesized form of the MCM-5, the silicophosphoaluminate can also contain entrapped organic material, A, and water molecules. It then has the general formula:

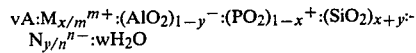

$$vA:M_{x/m}^{m+}:(AlO_2)_{1-y}^-:(PO_2)_{1-x}^+:(SiO_2)_{x+y}:N_{y/n}^{n-}:wH_2O$$

wherein v is the number of moles of A, occluded organic material resulting from organic directing agent and/or solvent used in synthesis of and filling microporous voids of the MCM-5, which material may be removed upon calcination, w is moles of $H_2O$, e.g. from 0 to about 5, and x and y are the numbers defined hereinbefore. The MCM-5 crystalline material in the as-synthesized form has the characteristic X-ray diffraction pattern as set forth in Table 1-A hereinafter.

The crystalline silicophosphoaluminate of this invention is a unique composition of matter which exhibits a valuable combination of catalytic and ion-exchange properties which distinguishes it from known aluminum phosphates.

EMBODIMENTS

The disclosure of U.S. application Ser. No. 562,908 is incorporated herein by reference.

The silicophosphoaluminate material of the present invention will exhibit unique and useful catalytic and adsorptive properties along with a silicon/(aluminum and phosphorus) atomic ratio of less than unity, e.g. from about 0.001 to about 0.99. If synthesized with an aluminum/phosphorus atomic ratio of greater than one, the crystalline silicophosphoaluminate exhibits an aluminum/silicon atomic ratio of greater than 1.5, and usually in the range from 1.6 to 600. When the aluminum/phosphorus atomic ratio is of less than one, it exhibits a phosphorus/silicon atomic ratio of greater than unity, usually within the range from 1.2 to 600. It is well recognized that aluminum phosphates exhibit a phosphorus/aluminum atomic ratio of only 0.8 to 1.2 and contain no silicon. Also, the phosphorus-substituted zeolite compositions, sometimes referred to as "aluminosilicophosphate zeolites", have a silicon/aluminum atomic ratio of from 0.66 to 8.0, and a phosphorus/aluminum atomic ratio of from greater than 0 to 1.0.

The original cations of the as synthesized MCM-5 can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which render the MCM-5 catalytically active, especially for hydrocarbon conversion. These include hydrogen, rare earth metal and metals of Groups IA, IIA, IIIA, IVA, IB, IIB, IIIB, IVB, VIB and VIII of the Periodic Table of the Elements.

Typical ion exchange technique would be to contact the synthetic MCM-5 with a salt of the desired replacing cation or cations. Examples of such salts include the halides, e.g. chlorides, nitrates and sulfates.

The crystalline MCM-5 of the present invention can be beneficially thermally treated, either before or after ion exchange. This thermal treatment is performed by heating the silicophosphoaluminate in an atmosphere such as air, nitrogen, hydrogen, steam, etc., at a temperature of from about 300° C. to about 1100° C., preferably from about 350° C. to about 750° C., for from about 1 minute to about 20 hours. While subatmospheric or superatmospheric pressures may be used for this thermal treatment, atmospheric pressure is desired for reasons of convenience.

MCM-5 exhibits a definite X-ray diffraction pattern which distinguishes it from other crystalline materials. The X-ray diffraction pattern of the as synthesized MCM-5 has the following characteristic values:

TABLE 1-A

| Interplanar d-Spacing (A) | Relative Intensity |
| --- | --- |
| 8.60 ± 0.1 | vs |
| 6.78 ± 0.1 | w |
| 4.75 ± 0.05 | w |
| 4.64 ± 0.05 | w |
| 4.35 ± 0.03 | w |
| 3.71 ± 0.03 | w |
| 3.66 ± 0.03 | w |
| 3.39 ± 0.03 | w |
| 3.22 ± 0.03 | w |
| 3.16 ± 0.02 | w |
| 3.02 ± 0.02 | w |
| 2.70 ± 0.02 | w |

TABLE 1-B

| Interplanar d-Spacing (A) | Relative Intensity |
| --- | --- |
| 6.84 ± 0.05 | w |
| 4.45 ± 0.05 | w |
| 4.36 ± 0.05 | vs |
| 4.12 ± 0.05 | vs |
| 3.86 ± 0.04 | s |
| 3.77 ± 0.04 | w |
| 3.44 ± 0.04 | w |
| 3.00 ± 0.03 | w |
| 2.88 ± 0.02 | w |
| 2.81 ± 0.02 | w |

These X-ray diffraction data were collected with a Rigaku X-ray system, using copper K-alpha radiation. The positions of the peaks, expressed in degrees 2, theta, where theta is the Bragg angle, were determined by step-scanning at 0.02 degrees of 2 theta intervals and a counting time of 1 second for each step. The interplanar spacings, d, measured in Angstrom units (A), and the relative intensities of the lines, $I/I_o$, wherein $I_o$ is one-hundredth of the intensity of the strongest line, including subtraction of the background, were derived with the use of a profile fitting routine. The relative intensities are given in terms of the symbols vs=very strong (75–100%), s=strong (50–74%), m=medium (25–49%) and w=weak (0–24%). It should be understood that this X-ray diffraction pattern is characteristic of all the species of MCM-5 compositions synthesized by the present invention. Ion exchange of cations with other ions results in a silicophosphoaluminate which reveals substantially the same X-ray diffraction pattern with some minor shifts in interplanar spacing and variation in relative intensity. Other variations can occur, depending on the silicon/aluminum and phosphorus/aluminum ratios of the particular sample, as well as its degree of thermal treatment.

The crystalline MCM-5 material of this invention may be converted to the dry, hydrogen form by the above thermal treatment of the organic cation-containing form or hydrogen ion precursor-containing form resulting from ion exchange.

In general, the silicophosphoaluminate of the present invention can be prepared from a two-phase reaction mixture containing sources of aluminum, phosphorus and silicon and an organic directing agent(s), and a substantially water-immiscible organic solvent. The overall molar composition of the two-phase synthesus mixture is, in terms of oxides and organic components:

$$(A)_a:(M_2O)_b:(Al_2O_3)_c:(SiO_2)_d:(P_2O_5)_e:(Solvent)_f:(anion\ source)_g:(H_2O)_n$$

where: $a/(c+d+e)$ is less than 4, $b/(c+d+e)$ is less than 2, $d/(c+e)$ is less than 2, $f/(c+d+e)$ is from 0.1 to 15, $g/(c+d+e)$ is less than 2 and $h/(c+d+e)$ is from 3 to 150. The "Solvent" is an organic solvent and "A" is any organic compound or material such as that derived from an organic directing agent or organic solvent. The anion is not necessarily separately added to the two-phase system, but may or may not appear in the product crystals from one or more of the other component sources.

Reaction conditions consist of carefully heating the foregoing reaction mixture at a rate of from 5° C. to 200° C. per hour to a temperature of from about 80° C. to about 300° C. for a period of time of from about 5 hours to about 500 hours until crystals of MCM-5 are formed. A more preferred temperature range is from about 100° C. to about 200° C. with the amount of time at a temperature in such range being from about 24 hours to about 168 hours. During heating and maintaining the reaction mixture at the desired temperature, the pH must be carefully controlled to be from about 2 to about 9. Control of pH can be accomplished by adjusting the concentration of the added organic and/or inorganic base(s).

The reaction is carried out until crystals of the desired MCM-5 form. The crystalline product is recovered by separating same from the reaction medium, as by cooling the whole to room temperature, filtering and washing with water before drying.

The above reaction mixture composition can be prepared utilizing materials which supply the appropriate components. The aqueous phase components may include from the sources of the elements silicon, phosphorus or aluminum, those not included in the organic phase. The organic phase comprises an organic solvent and a source of at least one of the elements silicon, phosphorus, or aluminum insoluble in the aqueous phase under reaction conditions. The aqueous phase also contains the required organic and/or inorganic directing agent(s).

The useful sources of aluminum, as non-limiting examples, include any known form of aluminum oxide or hydroxide, organic or inorganic salt or compound. The useful sources of silicon include, as non-limiting examples, any known form of silicon dioxide or silicic acid, alkoxy- or other compounds of silicon. The useful sources of phosphorus include, as non-limiting examples, any known form of phosphorus acids or phosphorus oxides, phosphates and phosphites, and organic derivates of phosphorus. The organic solvent is a $C_5$-$C_{10}$ alcohol or any other liquid organic compond substantially immiscible with water.

The organic directing agent can be selected from the group consisting of organic mono-, di-, or polyamines and onium compounds having the following formula:

$$R_4M^+X^-\ \text{or}\ (R_3M^+R'M^+R_3)X_2$$

wherein R or R' is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a tetracoordinate element (e.g. nitrogen, phosphorus, arsenic, antimony or bismuth) or a heteroatom (e.g., N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

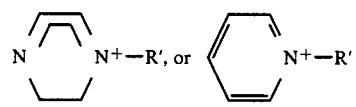

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

Particularly preferred directing agents for the present method include onium compounds, above defined, wherein R is alkyl of 1 to 4 carbon atoms, M is nitrogen and X is halide or hydroxide. Non-limiting examples of these include tetrapropylammonium hydroxide, tetraethylammonium hydroxide and tetrapropylammonium bromide.

An inorganic hydroxide or salt or suitable composition can also be used as supplemental directing agent, non-limiting examples being CsOH, KOH, CsCl, KCl and the like.

The MCM-5 crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

It may be desired to incorporate the new MCM-5 crystal with another material, i.e., a matrix, resistant to the temperatures and other conditions employed in various organic conversion processes. Such materials include active and inactive material and synthetic or naturally occuring zeolites as well as inorganic materials such as clays, silica and/or metal oxides, e.g. alumina. The latter may be either naturally occurring or in the form of gelatinous precipitates or gels including mixtures of silica and metal oxides. Catalyst compositions containing the MCM-5 crystals will generally comprise from about 1% to 90% by weight of the MCM-5 material and from about 10% to 99% by weight of the matrix material. More preferably, such catalyst compositions will comprise from about 2% to 80% by weight of the MCM-5 material and from about 20% to 98% by weight of the matrix.

Use of a material in conjunction with the new MCM-5 crystal, i.e. combined therewith, which is active, tends to alter the conversion and/or selectivity of the overall catalyst in certain organic conversion processes. Inactive materials suitably serve as diluents to control the amount of conversion in a given process so that products can be obtained economically and orderly without employing other means for controlling the rate of reaction. These material may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the crush strength of the overall catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the crystalline MCM-5 can be composited with a porous matrix material such as aluminum phosphate silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

Employing a catalytically active form of the novel MCM-5 material of this invention as a catalyst component, said catalyst possibly containing additional hydrogenation components, reforming stocks can be reformed employing a temperature of from about 370° C. to about 540° C., a pressure of from about 100 psig to about 1000 psig (791 to 6996 kPa), preferably from about 200 psig to about 700 psig (1480 to 4928 kPa), a liquid hourly space velocity is from about about 0.1 to about 10, preferably from about 0.5 to about 4, and a hydrogen to hydrocarbon mole ratio of from about 1 to about 20, preferably from about 4 to about 12.

A catalyst comprising the present MCM-5 material can also be used for hydroisomerization of normal paraffins, when provided with a hydrogenation component, e.g. platinum. Such hydroisomerization is carried out at a temperature of from about 90° C. to about 375° C., preferably from about 145° C. to about 290° C., with a liquid hourly space velocity of from about 0.01 to about 2, preferably from about 0.25 to about 0.50, and with a hydrogen to hydrocarbon mole ratio of from about 1:1 to about 5:1. Additionally, such a catalyst can be used for olefin or aromatic isomerization, employing a temperature of from about 200° C. to about 480° C.

Such a catalyst can also be used for reducing the pour point of gas oils. This reaction is carried out at a liquid hourly space velocity of from about 10 to about 30 and at a temperature of from about 425° C. to about 595° C.

Other reactions which can be accomplished employing a catalyst comprising the MCM-5 of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,354,078 and in *The Journal of Catalysis*, Vol. IV, pp. 522–529 (August 1965), each incorporated herein by reference as to that description.

When ion-exchange capacity is examined, it is determined by titrating with a solution of sulfamic acid the gaseous ammonia evolved during the temperature programmed decomposition of the ammonium-form of the silicophosphoaluminate. The method is described in *Thermochimica Acta*, Vol. III, pp. 113–124, 1971 by G. T. Kerr and A. W. Chester, herein incorporated by reference as to that description.

EXAMPLE 1

A two-phase synthesis reaction mixture was prepared with the organic phase comprised of 60 g 1-hexanol and 10 g of $Si(OC_2H_5)_4$, and the aqueous phase comprised of 23.1 g, $H_3PO_4$ (85%), 13.7 g $Al_2O_3$, 26 g TPABr (tetrapropylammonium bromide), 4 g NaOH and 100 g of water. The reaction mixture as a whole had a composition including 9.3% Si, 38.6% P and 52.1% Al, the percentages atomic. The directing agent was tetrapropylammonium bromide.

The reaction mixture was heated at 50° C. per hour to 150° C. and maintained at that temperature for 168 hours until crystals of silicophosphoaluminate formed. The starting pH was between 5 and 7.

The crystalline product was separated from the reaction mixture by filtration, water washed and then dried at 80° C. The product crystals were analyzed to contain 10.6% Si, 44.3% P and 45.1% Al, percentages atomic. A sample of the as synthesized silicophosphoaluminate was then submitted for X-ray analysis and found to be a crystalline material exhibiting the diffraction lines shown in Table 2.

TABLE 2

| Interplanar d-Spacing (A) | Observed 2× Theta | Relative Intensity, I/I$_o$ |
|---|---|---|
| 8.5984 | 10.279 | 100.00 |
| 6.7810 | 13.045 | 3.05 |
| 4.7545 | 18.647 | 4.65 |
| 4.6389 | 19.116 | 6.49 |
| 4.5429 | 19.524 | 1.58 |

TABLE 2-continued

| Interplanar d-Spacing (A) | Observed 2× Theta | Relative Intensity, $I/I_o$ |
|---|---|---|
| 4.4200 | 20.072 | 2.00 |
| 4.3500 | 20.398 | 3.00 |
| 4.2206 | 21.031 | 2.60 |
| 4.1134 | 21.586 | 2.37 |
| 3.8541 | 23.058 | 1.60 |
| 3.7092 | 23.971 | 6.80 |
| 3.6724 | 24.215 | 3.65 |
| 3.4981 | 25.441 | 1.08 |
| 3.3886 | 26.278 | 3.73 |
| 3.3331 | 26.723 | 0.48 |
| 3.2150 | 27.724 | 4.51 |
| 3.1616 | 28.202 | 2.87 |
| 3.0206 | 29.548 | 2.28 |
| 2.9090 | 30.709 | 1.12 |
| 2.8887 | 30.930 | 1.63 |
| 2.7450 | 32.594 | 1.07 |
| 2.7005 | 33.146 | 2.00 |
| 2.6774 | 33.441 | 0.84 |
| 2.6472 | 33.833 | 0.73 |
| 2.5890 | 34.618 | 1.34 |
| 2.5760 | 34.797 | 1.30 |

EXAMPLE 2

A quantity of the crystalline silicophosphoaluminate of Example 1 was calcined at 450° C. in nitrogen for 4 hours and then X-ray analyzed. The results are presented in Table 3.

| Interplanar d-Spacing (A) | Observed 2× Theta | Relative Intensity, $I/I_o$ |
|---|---|---|
| 6.8404 | 12.931 | 4.54 |
| 6.1964 | 14.282 | 3.18 |
| 4.4549 | 19.914 | 15.75 |
| 4.3558 | 20.372 | 85.21 |
| 4.1224 | 21.538 | 100.00 |
| 3.8576 | 23.037 | 56.70 |
| 3.7690 | 23.586 | 7.17 |
| 3.4447 | 25.843 | 6.41 |
| 3.3668 | 26.451 | 3.29 |
| 3.0692 | 29.070 | 4.39 |
| 2.9985 | 29.771 | 20.24 |
| 2.8825 | 30.999 | 10.45 |
| 2.8089 | 31.832 | 6.32 |

EXAMPLE 3

A quantity of the crystalline silicophosphoaluminate of Example 1 was calcined as described in Example 2 and ammonium-exchanged using a 1M NH$_4$NO$_3$ solution. The ion-exchange capacity measured from the evolution of ammonia was determined to be 0.12 meq/g.

What is claimed is:

1. A synthetic crystalline material having a composition as follows:

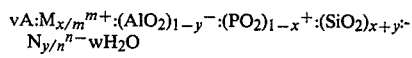

wherein M is a cation of valence m, N is an anion of valence n, A is occluded organic directing agent and solvent, v is the number of moles of A, w is the number of of moles of H$_2$O and x and y are numbers of from greater than $-1$ to less than $+1$ which satisfy the relationships:

(1) if x is 0, then y is not 0,
(2) if y is 0, then x is not 0,
(3) if the atomic ratio of Al/P is greater than 1, then $x+y$ is greater than 0.001 and $y+0.6x$ is less than 0.4, and
(4) if the atomic ratio of Al/P is less than 1, then $x+y$ is greater than 0.001 and $x+0.5y$ is less than 0.5, which, as synthesized, exhibits a characteristic X-ray diffraction pattern as shown in Table 1-A of the specification.

2. The synthetic crystalline material of claim 1 which, following calcination, exhibits a characteristic X-ray diffraction pattern as shown in Table 1-B of the specification.

3. The synthetic crystalline material of claim 2 having a composition in the anhydrous state as follows:

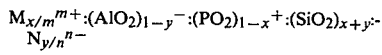

wherein M is a cation of valence m, N is an anion of valence n, and x and y are numbers of from greater than $-1$ to less than $+1$ which satisfy the rationships:

(1) if x is 0, then y is not 0,
(2) if y is 0, then x is not 0,
(3) if the atomic ratio of Al/P is greater than 1, then $x+y$ is greater than 0.001 and $y+0.6x$ is less than 0.4, and
(4) if the atomic ratio of Al/P is less than 1, then $x+y$ is greater than 0.001 and $x+0.5y$ is less than 0.5.

4. The crystalline material of claim 3 having cations replaced, at least in part, with a cation or a mixture of cations selected from the group consisting of hydrogen and hydrogen precursors, rare earth metals and metals from Groups IA, IIA, IIIA, IVA, IB, IIB, IIIB, IVB, VIB and VIII of the Periodic Table of the Elements.

5. The crystalline material resulting from thermal treatment of the crystalline material of claim 4.

6. The crystalline material of claim 2 having cations replaced, at least in part, with a cation or a mixture of cations selected from the group consisting of hydrogen and hydrogen precursors, rare earth metals and metals from Groups IA, IIA, IIIA, IVA, IB, IIB, IIIB, IVB, VIB and VIII of the Periodic Table of the Elements.

7. A catalyst composition comprising from 1% to 90% by weight of the crystalline material of claim 6 and from 10% to 99% by weight of a matrix material.

8. The crystalline material resulting from thermal treatment of the crystalline material of claim 6.

9. A catalyst composition comprising from 1% to 90% by weight of the crystalline material of claim 8 and from 10% to 99% by weight of a matrix material.

10. A catalyst composition comprising from 1% to 90% by weight of the crystalline material of claim 2 and from 10% to 99% by weight of a matrix material.

11. The crystalline material of claim 1 having cations replaced, at least in part, with a cation or a mixture of cations selected from the group consisting of hydrogen and hydrogen precursors, rare earth metals and metals from Groups IA, IIA, IIIA, IVA, IB, IIB, IIIB, IVB, VIB and VIII of the Periodic Table of the Elements.

12. The crystalline material resulting from thermal treatment of the crystalline material of claim 11.

13. A catalyst composition comprising from 1% to 90% by weight of the crystalline material of claim 12 and from 10% to 99% by weight of a matrix material.

14. A catalyst composition comprising from 1% to 90% by weight of the crystalline material of claim 11 and from 10% to 99% by weight of a matrix material.

15. The crystalline material of claim 1 having cations replaced, at least in part, with a cation or a mixture of cations selected from the group consisting of hydrogen and hydrogen precursors, rare earth metals and metals from Groups IA, IIA, IIIA, IVA, IB, IIB, IIIB, IVB, VIB and VIII of the Periodic Table of the Elements.

16. The crystalline material resulting from thermal treatment of the crystalline material of claim 15.

17. The crystalline material resulting from thermal treatment of the crystalline material of claim 1.

18. A catalyst composition comprising from 1% to 90% by weight of the crystalline material of claim 1 and from 10% to 99% by weight of a matrix material.

* * * * *